United States Patent [19]

Beckham et al.

[11] Patent Number: 5,387,738
[45] Date of Patent: Feb. 7, 1995

[54] REAGENT FOR TREATING A CONTAMINATED WASTE MATERIAL AND METHOD FOR SAME

[76] Inventors: Doyle H. Beckham, 2326 N. Aspen, Pampa, Tex. 79065; Harry E. Robson, 3131 Congress Blvd., Baton Rouge, La. 70808

[21] Appl. No.: 970,630

[22] Filed: Nov. 3, 1992

[51] Int. Cl.6 .......................... B09B 1/00; B09B 3/00
[52] U.S. Cl. .................... 588/256; 588/257; 106/626; 106/796; 405/128
[58] Field of Search ............. 106/600, 612, 626, 710, 106/793, 796, 799, 900; 501/411; 71/59, 61; 405/128, 129; 588/252, 256, 257

[56] References Cited

U.S. PATENT DOCUMENTS

| | | |
|---|---|---|
| 3,336,146 | 8/1967 | Hensehel . |
| 3,929,586 | 12/1975 | Slikkers, Jr. ............... 203/37 |
| 4,295,893 | 10/1981 | Takahashi et al. ............. 106/120 |
| 4,417,976 | 11/1983 | Sander et al. ............... 208/188 |
| 4,435,216 | 3/1984 | Diehl et al. . |
| 4,493,725 | 1/1985 | Moon ............................. 71/62 |
| 4,701,219 | 10/1987 | Bonee . |
| 4,741,776 | 5/1988 | Bye et al. . |
| 4,762,623 | 8/1988 | Kapland ......................... 210/751 |
| 4,810,280 | 3/1989 | Van Mao et al. ................ 71/62 |
| 4,859,367 | 8/1989 | Davidovits ..................... 252/628 |
| 4,889,640 | 12/1989 | Stanforth ....................... 210/751 |
| 4,950,409 | 8/1990 | Stanforth ....................... 210/751 |
| 5,028,272 | 7/1991 | Bonee .......................... 106/792 |
| 5,064,526 | 11/1991 | Rogers et al. .................. 208/262.5 |
| 5,082,488 | 1/1992 | Van Mao ........................ 71/62 |
| 5,139,760 | 8/1992 | Ogawa et al. ................... 423/328 |
| 5,207,830 | 5/1993 | Cowan et al. ................... 106/672 |

*Primary Examiner*—Randolph A. Reese
*Assistant Examiner*—John Ricci

[57] ABSTRACT

A reagent material useful for converting a contaminated waste material, which is environmentally unacceptable, to a relatively harmless granular substance which is environmentally acceptable. The reagent material is comprised of an effective amount of alumina, silica, a hydroxide, or hydroxide precursor, of an alkali metal, calcium oxide, and a medium to large pore zeolitic material. The method involves blending an effective amount of the reagent material with the waste material and allowing it to dry without setting, thereby resulting in an environmentally acceptable particulate substance.

26 Claims, No Drawings

REAGENT FOR TREATING A CONTAMINATED WASTE MATERIAL AND METHOD FOR SAME

FIELD OF THE INVENTION

The present invention relates to a reagent material useful for converting a contaminated waste material, which is environmentally unacceptable, to a relatively harmless granular substance which is environmentally acceptable. The reagent material is comprised of an effective amount of alumina, silica, a hydroxide, or hydroxide precursor, of an alkali metal, calcium oxide, and a zeolitic material. The method involves blending an effective amount of said reagent material with said waste material and allowing it to dry without setting, thereby resulting in an environmentally acceptable particulate substance.

BACKGROUND OF THE INVENTION

All industrial societies are faced with significant environmental problems associated with industrial waste materials, many of which are hazardous to both animal and plant life. Examples of such waste materials include sludges which settle as sedimentation layers at the bottom of the sea, lakes, and rivers; effluent sludges discharged from various industries including pharmaceutical, tanning, paper and pulp manufacturing, wool washing, fermenting, food processing, metal surface processing, plating, ore dressing, coal washing, and fume desulfurizing; as well as other wastes such as sewage sludges discharged from sewage processing stations, and those resulting from the refining of petroleum products. Such wastes are often contaminated with substances which can have an adverse effect on the ecological system. Contaminants found in such wastes often include unacceptable levels of heavy metals such as copper, lead, cadmium, arsenic, mercury, hexavalent chromium. Also found are other chronically toxic compounds such as PCB, PCP, DDT, 2-BHC, Dieldrin, Chlordecone, Mirex, Parathion, cyanic compounds, alkyl-mercury compounds, dioxins, furans; and the like. These waste materials are sometimes referred to herein as environmentally unacceptable.

The treatment and handling of such contaminated waste materials, many of which can be classified as hazardous, is strictly regulated by one or more governmental agencies because of their potential harm to the public welfare. As such, a great deal of work has been done in recent years in developing methods for safely handling these materials and for neutralizing their troublesome characteristics so they can be safely discarded.

Non-limiting examples of methods which have been developed and which have met with varying degrees of success, include sorption, adsorption, volatilization, biodegradation, chemisorption, passivation, ion-exchange, encapsulation, and embedment through solidification into a monolith structure, as well as stabilization of chemical constituents. Sorption involves adding a solid to the hazardous waste material to soak-up any liquid which is present. Non-biodegradable materials are typically used as the sorbent. Such materials include activated carbon, anhydrous sodium silicate, various forms of gypsum, celite, clays, bottom ash, fly ash, fly dust, kiln ash, and cement kiln dust. Biodegradable materials can also be used, such as peat moss, rice hulls, sawdust, and the like. These treatments primarily use biodegradation for reducing organic constituents of the waste material. The sorbent may interact chemically with the waste material, or it may simply be wetted by the liquid portion which is retained in the sorbent as a capillary liquid. Sorption generally cannot be used with many types of hazardous waste, such as those which contain potentially hazardous components, because they can often be easily leached from the sorbent. This is because sorption typically only requires that it be mixed with the waste. Further, as governmental regulations become ever stricter, sorption becomes less and less attractive for meeting such regulations.

Another method for treating hazardous waste involves the consolidation and solidification of the waste into a solid block of material that has relatively high structural integrity. The resulting block is often called a monolith. The monolith can be as small as the contents of a steel drum, or it can encompass the entire waste disposal site, called a monofill. The components of the monolith do not necessarily interact chemically with the reagents, but are usually mechanically locked within a solidified matrix, called microencapsulation. Contaminant loss is primarily limited by decreasing the surface area which is exposed to the environment and/or isolating the contaminants from environmental influences by encapsulating the waste particles. Wastes can also be microencapsulated. That is, bonded to, or surrounded by, an impervious coating.

While solidification can be very effective for treating some hazardous wastes, recently passed governmental regulations are placing greater demands on this technology. This is because of the ever stricter limitations relating to acceptable levels of leachates from the solidified block. Also, the block must withstand ever greater physical pressures without cracking and exposing contaminants to environmental influences.

Other methods of hazardous waste treatment include inorganic and organic stabilization. Unlike solidification processes which convert wastes into a solid mass, stabilization processes can reduce the solubility or chemical reactivity of the waste. Stabilization processes typically include adjusting pH, converting metals to hydroxides, and/or establishing oxidation-reduction conditions to prevent solubilization or leaching of contaminants into ground water. The most commonly used inorganic stabilization processes include mixing the waste product with inorganic materials such as fly ash, cement kiln dust, lime kiln dust, hydrated lime, Portland cement, or other pozzolanic materials. Stabilization processes, like solidification, are being pushed to meet the stricter governmental regulations.

A typical stabilization process is taught in U.S. Pat. Nos. 4,781,842 and 4,902,431 wherein a sewage sludge is stabilized and converted to fertilizer by mixing the sludge with an alkaline material which is sufficient to raise the pH to at least 12. The mixture is then allowed to dry for at least one day. The alkaline material is selected from cement, kiln dust, and lime dust, to achieve chemical stabilization. Bulking materials, such as slag fines, fly ash, gypsum, etc. may also be added. Such a process is primarily a drying process to eliminate offensive odors and pathogenic microorganisms. The process is not capable of generating a substantial amount of heat to destroy many of the contaminants.

Also, U.S. Pat. No. 4,859,367 teaches a waste solidification method wherein toxic mine tailings are incorporated into a cement mixture which contains a mineral binder selected from the class of alkali-activated silicoaluminate geopolymers which is stated to be related to natural and synthetic zeolites and feldspathoids.

Although a significant amount of work has already been done to treat contaminated waste materials, there is still a considerable need in the art for improved methods for treating and neutralizing such materials.

SUMMARY OF THE INVENTION

In accordance with the present invention, there is provided a reagent material for treating environmentally unacceptable waste materials, which reagent material, by weight, is comprised of:
(i) 1 part alumina; (ii) 1 to 3 parts of a silica having a surface area of at least about 10 m$^2$/g; (iii) 0.5 to 3 parts of a hydroxide, or hydroxide precursor, of an alkali metal; (iv) 2 to 5 parts of CaO; (v) 2 to 5 parts of a zeolitic material having a pore diameter equal to or greater than 4 Å, and an SiO$_2$ to Al$_2$O$_3$ ratio greater than or equal to 2.5.

Also in accordance with the present invention is an innocuous solid waste mixture which may be safely disposed of in a landfill comprising:
(a) a reagent material comprised of: (i) 1 part alumina; (ii) 1 to 3 parts of a silica having a surface area of at least about 10 m$^2$/g; (iii) 0.5 to 3 parts of a hydroxide, or hydroxide precursor of an alkali metal; (iv) 2 to 5 parts of CaO; and (v) 2 to 5 parts of a zeolitic material having a pore diameter equal to or greater than 4 Å, and an SiO$_2$ to Al$_2$O$_3$ ratio greater than or equal to 2.5; and
(b) a waste material, which prior to a reaction with said reagent material, contains unacceptable levels of one or more contaminants selected from the group consisting of heavy metals and organic components.

Also in accordance with the present invention, there is provided a method for treating an environmentally unacceptable contaminated waste material to convert it to an environmentally acceptable material, which method comprises mixing said contaminated waste material with an effective amount of a reagent material comprised of: (i) 1 part alumina; (ii) 1 to 3 parts of a silica having a surface area of at least about 10 m$^2$/g; (iii) 0.5 to 3 parts of a hydroxide, or hydroxide precursor, of an alkali metal; (iv) 2 to 5 parts of CaO; and (v) 2 to 5 parts of a zeolitic material having a pore diameter equal to or greater than 4 Å, and an SiO$_2$ to Al$_2$O$_3$ ratio greater than or equal to 2.5.

In a preferred embodiment of the present invention, the alkali metal hydroxide is NaOH, and the zeolite is a zeolite material which is iso-structural to a zeolite selected from clinoptilolite and chabazite.

In other preferred embodiments of the present invention, the reagent material is comprised of: (i) 1 part alumina; (ii) 1.5 to 2.5 parts of a silica having a surface area of at least about 10 m$^2$/g; (iii) 0.5 to 1.5 parts of a hydroxide of an alkali metal; (iv) 2.5 to 3.5 parts of CaO; and (v) 2.5 to 3.5 parts of a zeolitic material having a pore diameter equal to or greater than 4 Å, and an SiO$_2$ to Al$_2$O$_3$ ratio greater than or equal to 2.5.

In yet other preferred embodiments of the present invention, the contaminated waste material is selected from the group consisting of sewage sludge; a biologic organic waste material; a non-biologic waste material; waste resulting from the drilling, production, and processing of petroleum, such as tanker bottoms; and waste contaminated with a naturally occurring radioactive material.

DESCRIPTION OF THE INVENTION

Any contaminated waste material may be treated in accordance with the present invention so long as it is a solid a liquid, or combination thereof. A typical waste stream which can be treated in accordance with the present invention is in the form of a sludge. The term "sludge" as used herein, means a material which is flowable at ordinary temperatures and at about atmospheric pressure, but which has a relatively high solids content, and which can typically be pumped by conventional pumping means. Non-limiting examples of such wastes included sludges which settle as sedimentation layers at the bottom of the sea, lakes, and rivers; effluent sludges discharged from various industries including pharmaceutical, tanning, paper and pulp manufacturing, wool washing, fermenting, food processing, metal surface processing, plating, ore dressing, coal washing, and fume desulfurizing; and still other wastes, such as sewage sludges discharged from sewage processing stations, and those resulting from the drilling, production, and processing of petroleum. Such wastes are often contaminated with substances which have an adverse affect on the ecological system. Non-limiting examples of such substances include heavy metals, such as copper, lead, cadmium, arsenic, mercury, hexavalent chromium; and other chronically toxic compounds such as PCB, PCP, DDT, 2-BHC, Dieldrin, Chlordecone, Mirex, Parathion, cyanic compounds, alkyl-mercury compounds, dioxins, furans; and the like. It is also within the scope of the present invention to treat a waste material which is contaminated with naturally occurring radioactive materials.

The term "contaminated waste" as used herein, means any waste material which is environmentally unacceptable. By "environmentally unacceptable" we mean those materials which governmental regulations define as being harmful, or potentially harmful, to the ecological system pertaining to the environment and which must be disposed of in accordance with governmental laws and/or regulations.

In accordance with the present invention, the contaminated waste material to be treated, will typically not meet environmental laws and/or regulations. After treatment, the waste is converted to a relatively innocuous granular substance. That is, a substance which will meet such regulations, and which will thus be environmentally acceptable. The resulting innocuous material is a granulated, or particulate substance, which when mixed with soil, will support the growth of vegetation. Furthermore, the method of the present invention can be performed on-site; thus, not requiring the transportation of contaminated substances which may be subject to even more restrictive regulations.

The waste material to be treated is placed into a containing means. Any suitable containing means may be used. Non-limiting examples of suitable containing means include earthen pits, barges, drums, as well as any relatively large metal container, such as those used to haul trash and soil. The particular containing means used will depend on such things as economics of the job, the waste to be treated, and the amount of waste to be treated.

An effective amount of reagent material is mixed with the waste to be treated. An effective amount will typically be that minimum amount needed to contact an effective amount of the waste material to an innocuous material. That is, enough which will contact at least that fraction of the waste material which must be treated to render the entire volume of treated waste material environmentally acceptable. Of course, it is most preferred to contact substantially all of the waste. For typical treatments and wastes, a preferred ratio of reagent material to waste material will range from about 10/1 to 1/10, more preferably from about 5/1 to 1/5, most preferably 2/1 to 1/2, particularly about 1/1. Of course, the level of contamination of the waste, the treating environment, and equipment used, will have an effect on the degree of mixing of reagent material and waste which can be achieved. It is especially preferred to achieve a substantially homogeneous mixture. Of course, water may be added to enhance mixing.

The reagent material of the present invention is comprised of: (i) 1 part alumina; (ii) 1 to 3 parts, preferably 1.5 to 2.5 parts silica; (iii) 0.5 to 3 parts, preferably 1 to 2 parts of a hydroxide, or hydroxide precursor, of an alkali metal; (iv) 2 to 5 parts, preferably from about 2.5 to 3.5 parts of CaO; (v) and 2 to 5 parts, preferably from about 2.5 to 3.5 parts of a zeolitic material. It is also preferred that the silica material have a surface area of at least about 10 $m^2/g$, preferably at least about 50 $m^2/g$. The preferred hydroxide is NaOH. It is understood that hydroxide precursor materials may also be used. None limiting examples of NaOH precursors include $Na_2O$, $NaAlO_2$, and $Na_2O.(SiO_2)_x$. Preferred zeolitic materials are those having an average pore diameter equal to or greater than 4 Å, preferably equal to or greater than 5 Å. The more preferred are zeolitic materials which are iso-structural to a zeolite selected from clinoptilolite and chabazite. It is also understood that precursors of both alumina and silica may be used. For example, bauxite, kaolin, $NaAlO_2$, and $Al_2O_3.3H_2O$ are preferred materials for the alumina component of the reagent material of this invention. Preferred silica materials include: silica gel, silica smoke, volcanic ash, kaolin, and sodium silicate (water glass).

The reagent material of the present invention, which will typically be in particulate or granular form, is used by mixing an effective amount of it with the waste material. As previously stated, it is preferred that the two be mixed as homogeneously as possible. The mixture of waste material and particulate reagent material will need to reach an effective temperature in order to initiate a chemical reaction between the reagent mixture and some of the contaminants in the waste material. An effective temperature can often be reached by merely mixing the reagent material with the waste material, particularly if the waste material contains water, thereby causing an exothermic reaction. If necessary, the mixture can be heated by an external heating means to achieve the effective temperature. It will be understood that the temperature of the mixture should not be allowed to reach a temperature at which undesirable, or toxic, gases evolve. Acceptable temperatures for most waste materials will range from about 50° C. to about 250° C., preferably from about 100° C. to about 200° C.

After the desired temperature is reached, and held there for an effective amount of time, the mixture is allowed to dry without setting. This ensures that a granular, or particulate, product is produced. Such a product can be mixed with soil and used to support the growth of vegetation.

The following examples are presently for illustrative purposes only and should not be taken as limiting the present invention in any way.

EXAMPLE 1

A sample (236 gm) of a soil/sludge from a contaminated site near Manvel, Tex., was treated with 236 gm of a reagent mixture of the present invention having the composition set forth in Table I below. Mixing was conducted by use of a mortar and pestle and the resulting mixture was held at 175° C. in an oven for 24 hours. After this treatment, the resulting dry sample was found to have lost 58 gm, which was assumed to be water because neither odor nor smoke was observed during heating. The texture of the treated material was observed to be a fine powder containing a few friable lumps. Analyses of the treated and untreated materials are given in Table II below.

EXAMPLE 2

A sample (200 gm) of a soil/tar from a contaminated site near Mayfield, Tex., was treated with 200 gm of the same reagent material which was used in Example 1 above. Mixing was again achieved by use of a mortar and pestle and the resulting mixture was heated at 175° C. in an oven for 24 hours. After this treatment, the dried sample was found to have lost 151 gm, which was assumed to have been water because neither odor nor smoke was observed during heating. The texture of the treated material was also found to be a fine powder containing a few friable lumps. Analyses of the treated and untreated materials are set forth in Table II below.

TABLE I

| Composition of the Reagent Material | | |
|---|---|---|
| Component | Wt. % | Parts |
| alumina trihydrate | 8.7 | 1.00 |
| sodium hydroxide | 10.0 | 1.15 |
| silica | 20.0 | 2.30 |
| zeolite* | 28.0 | 3.22 |
| dolomite oxide | 33.3 | 3.83 |
| Total | 100.0 | 11.50 |

*Clinoptilolite comprised of 84 wt. % clinoptilolite, 12 wt. % volcanic glass, 3 wt. % feldspar, and 1 wt. % hematite.

TABLE II

| | Example 1 | | Example 2 | |
|---|---|---|---|---|
| Analysis | As received | Treated | As Received | Treated |
| Aromatic volatile org. (micrograms/Kg) | | | | |
| xylenes | 3570 | BDL | 3820 | BDL |
| acetone | BDL | 920 | 10,000 | 8900 |
| toluene | BDL | BDL | 3830 | BDL |
| 2-butanone | BDL | 1300 | BDL | 680 |
| Base neut./Acid Extract | | | | |
| 2-methyl-naphthalene | 25,700 | BDL | BDL | BDL |
| phenanthrene | BDL | BDL | 91 | BDL |

BDL = below detectable limit

EXAMPLE 3

A sample (100 gm) of contaminated soil from a site near Mexico City was mixed with 100 gm of the reagent material used in the previous two examples. The two were mixed with a spatula in a stainless steel bowl. Water (61 gm) was added and blended into the sample resulting in a relatively stiff mud-like substance. After treating the mixture for 24 hr. at 175° C., the sample appeared to be powdery with only a few soft granules being present. There was no smoke or vapor evolution during heating, thus it was assumed that the weight loss was due to loss of water. The dry weight was found to be 174 gm. Analyses of the treated and untreated samples are given in Table III below.

TABLE III

| Analysis | As received | Treated |
| --- | --- | --- |
| Total volatile petroleum hydrocarbons (mg/Kg) | 3600 | <5 |
| Total Extractable Petroleum hydrocarbons (mg/Kg) | 32,000 | 25 |
| BTEX Analysis (μg/Kg) | | |
| benzene | <500 | 26 |
| toluene | 570 | 67 |
| ethylbenzene | 10,000 | 5.3 |
| xylenes | 68,000 | 28 |
| Organic Lead (mg/Kg) | 1.0 | <0.3 |

EXAMPLE 4

A sample (100 gm) of contaminated soil from Chemical Pollution Control of New York, N.Y., was treated with 100 gm of the reagent material of Example 1 above. The waste and reagent material were mixed with a mortar and pestle and placed in a 175° C. oven for 24 hr. The resulting dry sample appeared to be a powder and had a dry weight of 180 gm. The weight loss was assumed to be water because no odor or smoke was observed during heating. Analyses of the treated and untreated materials are given in Table IV below.

TABLE IV

| Analysis | As received | Treated |
| --- | --- | --- |
| Total volatile petroleum hydrocarbons (mg/Kg) | 22,000 | 23 |
| Total Extractable Petroleum hydrocarbons (mg/Kg) | 23,000 | 410 |
| BTEX Analysis (μg/Kg) | | |
| benzene | 47,000 | <50 |
| toluene | 1,100,000 | 820 |
| ethylbenzene | 370,000 | 350 |
| xylenes | 2,700,000 | 2,500 |

What is claimed is:

1. A reagent material for treating contaminated waste materials, which reagent material is comprised of:
   (i) 1 part alumina; (ii) 1 to 3 parts of a silica having a surface area of at least about 10 m$^2$/g; (iii) 0.5 to 3 parts of a component selected from hydroxide, and hydroxide precursors, of an alkali metal; (iv) 2 to 5 parts of CaO; (v) 2 to 5 parts of a zeolitic material having an average pore diameter equal to or greater than 4 Å, and an SiO$_2$ to Al$_2$O$_3$ ratio greater than or equal to 2.5.

2. The reagent material of claim 1 wherein the alkali metal component is selected from the group consisting of NaOH, Na$_2$O, NaAlO$_2$, and Na$_2$O.(SiO$_2$)$_x$.

3. The reagent material of claim 2 wherein the alkali metal component is NaOH.

4. The reagent material of claim 2 wherein the zeolitic material has an average pore diameter greater than 5 Å.

5. The reagent material of claim 4 wherein the zeolitic material is iso-structural with a zeolite selected from the group consisting of clinoptilolite and chabazite.

6. The reagent material of claim 4 wherein from about 1.5 to 2.5 parts of silica; about 1 to 2 parts of said alkali metal component; about 2.5 to 3.5 parts of CaO; and about 2.5 to 3.5 parts of zeolitic material are present.

7. The reagent material of claim 2 wherein the source of alumina is selected from the group consisting of Al$_2$O$_3$, bauxite, kaolin, NaAlO$_2$, and Al$_2$O$_3$.3H$_2$O.

8. The reagent material of claim 2 wherein the source of silica is selected from the group consisting of silica gel, silica smoke, volcanic ash, kaolin, and sodium silicate.

9. The reagent material of claim 2 wherein the zeolitic material has an average pore diameter greater than 5 Å; the source of alumina is selected from the group consisting of Al$_2$O$_3$, bauxite, kaolin, NaAlO$_2$, and Al$_2$O$_3$.3H$_2$O; and the source of silica is selected from the group consisting of silica gel, silica smoke, volcanic ash, kaolin, and sodium silicate.

10. An innocuous waste mixture which may be safely disposed of in a landfill comprising:
    (a) a reagent material comprised of: (i) 1 part alumina; (ii) 1 to 3 parts of a silica having a surface area of at least about 50 m$^2$/g; (iii) 0.5 to 3 parts of a component selected from hydroxides and hydroxide precursors of an alkali metal; (iv) 2 to 5 parts of CaO; (v) and 2 to 5 parts of a zeolitic material having an average pore diameter of at least about 4 Å, and an SiO$_2$ to Al$_2$O$_3$ ratio greater than or equal to 2.5; and
    (b) a waste material, which prior to a reaction with said reagent material, contains unacceptable levels of one or more contaminants selected from the group consisting of heavy metals and organic components.

11. The mixture of claim 10 wherein the alkali metal component is selected from the group consisting of NaOH, Na$_2$O, NaAlO$_2$, and Na$_2$O.(SiO$_2$)$_x$.

12. The reagent material of claim 11 wherein the alkali metal component is NaOH.

13. The mixture of claim 12 wherein the zeolitic material has an average pore diameter greater than about 5 Å.

14. The mixture of claim 12 wherein the zeolitic material is iso-structural to a zeolite selected from the group consisting of clinoptilolite and chabazite.

15. The mixture of claim 12 wherein from about 1.5 to 2.5 parts of silica; about 1 to 2 parts of said alkali metal component; about 2.5 to 3.5 parts of CaO; and about 2.5 to 3.5 parts of zeolitic material are present per 1 part of Al$_2$O$_3$.

16. The mixture of claim 15 wherein the zeolitic material has an average pore diameter greater than about 5 Å, the source of alumina is selected from the group consisting of Al$_2$O$_3$, bauxite, kaolin, NaAlO$_2$, and Al$_2$O$_3$.3H$_2$O; and the source of silica is selected from the group consisting of silica gel, silica smoke, volcanic ash, kaolin, and sodium silicate.

17. The mixture of claim 12 which contains contaminants selected from the group consisting of heavy metals, dioxins, and furans.

18. A method for treating an environmentally unacceptable contaminated waste material to convert it to an environmentally acceptable material, which method comprises mixing said contaminated waste material with an effective amount of a reagent material comprised of: (i) 1 part alumina; (ii) 1 to 3 parts of a silica having a surface area of at least about 50 m$^2$/g; (iii) 0.5 to 3 parts of a component selected from the hydroxides, and hydroxide precursors, of an alkali metal; (iv) 2 to 5 parts of CaO; and (v) 2 to 5 parts of a zeolitic material having an average pore diameter equal to or greater than 4 Å, and an $SiO_2$ to $Al_2O_3$ ratio greater than or equal to 2.5.

19. The method of claim 18 wherein the alkali metal component is selected from the group consisting of NaOH, $Na_2O$, $NaAlO_2$, and $Na_2O.(SiO_2)_x$.

20. The method of claim 19 wherein the alkali metal component is NaOH.

21. The method of claim 20 wherein from about 1.5 to 2.5 parts of silica; about 1 to 2 parts of said alkali metal component; about 2.5 to 3.5 parts of CaO; and about 2.5 to 3.5 parts of zeolitic material are present per 1 part of $Al_2O_3$.

22. The method of claim 19 wherein the zeolitic material has an average pore-diameter greater than about 5 Å.

23. The method of claim 19 wherein the zeolitic material is iso-structural to a zeolite selected from the group consisting of clinoptilolite and chabazite.

24. The method of claim 18 which contains contaminants selected from the group consisting of heavy metals, dioxins, and furans.

25. The method of claim 18 wherein the waste material is mixed with said reagent material at a temperature from about 50° C. to about 250° C.

26. The method of claim 25 wherein said temperature is from about 100° C. to about 200° C.

* * * * *